March 15, 1949.  R. E. WILLARD  2,464,628
DEVICE FOR MAGNETICALLY TRAPPING METAL PARTICLES
Filed Oct. 20, 1945  2 Sheets-Sheet 1
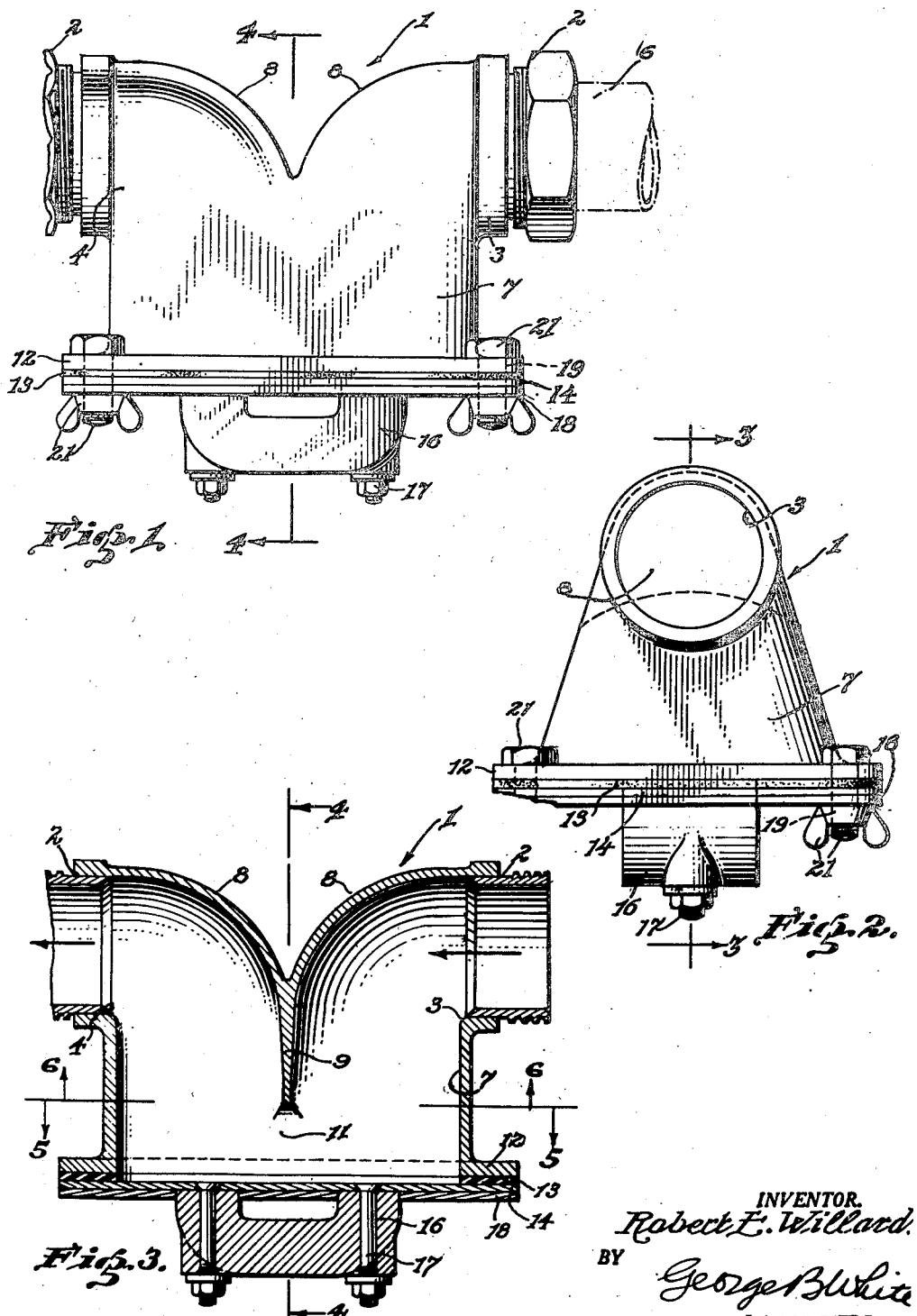
INVENTOR.
Robert E. Willard.
BY George B. White
ATTORNEY.

March 15, 1949. R. E. WILLARD 2,464,628
DEVICE FOR MAGNETICALLY TRAPPING METAL PARTICLES
Filed Oct. 20, 1945 2 Sheets—Sheet 2

INVENTOR.
Robert E. Willard
BY George B. White
ATTORNEY

Patented Mar. 15, 1949

2,464,628

UNITED STATES PATENT OFFICE 2,464,628

DEVICE FOR MAGNETICALLY TRAPPING METAL PARTICLES

Robert E. Willard, San Francisco, Calif., assignor to Donald E. Stem, San Francisco, Calif.

Application October 20, 1945, Serial No. 623,506

2 Claims. (Cl. 209—232)

1

This invention relates to apparatus for magnetically trapping metallic particles in the course of processing food or the like, and while such food or the like flows through a system of conduits.

The presence of metallic articles in processed food or the like is quite dangerous, and their removal in the past was limited only to comparatively large pieces of metal, and even then the methods and devices heretofore used were unreliable and left small metal particles in the food or the like.

An advantage of my invention is the removal of even extremely fine particles of metal from food or the like in the course of processing without the interruption of the processing operation or without the interruption of the continuity of flow of the food or the like in the processing system.

A feature of the invention is the change of speed and of the direction of flow of the processed food or the like within the system of conduits so that the change of speed and direction of flow brings practically the entire volume or mass of food or the like passing through the system into the vicinity or into actual contact with a magnetic surface in such a manner as to deposit all particles of metal upon such a magnetic surface and to trap all such deposits at said magnetic surface while the flow of the cleared food or the like continues through the system.

Other objects of the invention together with the foregoing will be set forth in the following description of the preferred method, and the preferred embodiment of means for practicing the same, which is illustrated in the drawings accompanying and forming part of the specification. It is to be understood that I do not limit myself to the embodiment disclosed in said description and the drawings as I may adopt variations of my preferred forms within the scope of my invention.

The invention is clearly illustrated in the accompanying drawings wherein:

Fig. 1 is a side view of an embodiment of my magnetic trap;

Fig. 2 is an end view of the same;

Fig. 3 is a sectional view, the section being taken on lines 3—3 of Fig. 2;

Figure 4:
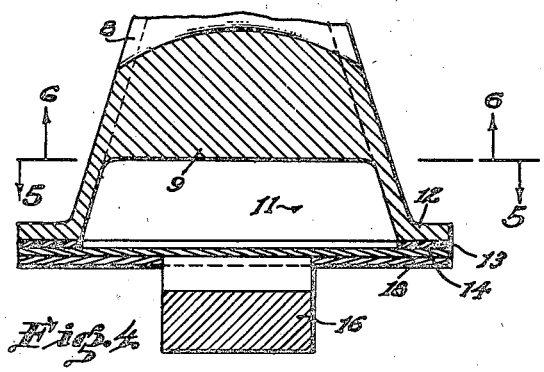
Fig. 4 is a sectional view, the section being taken on lines 4—4 of Fig. 1 and Fig. 3.
Figure 5:
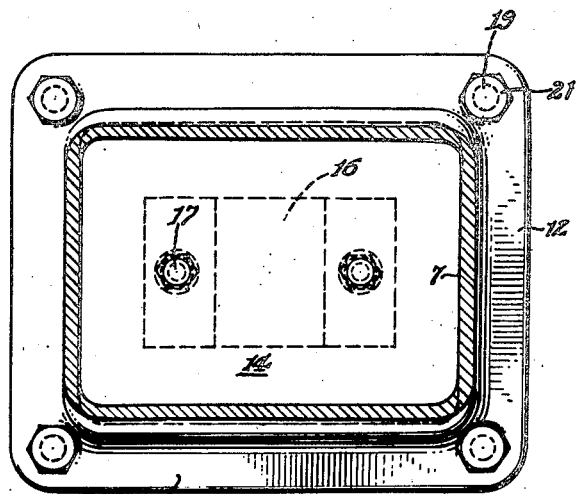
Fig. 5 is a sectional plan view, the section being taken on lines 5—5 of Fig. 3 viewing toward the bottom of the box.
Figure 6:
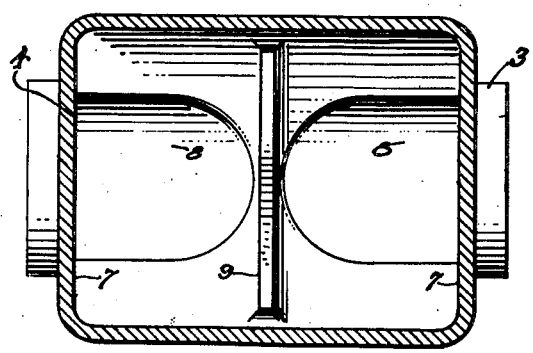
Fig. 6 is a sectional view, the section being taken on lines 6—6 of Fig. 3, viewing in the direction of the top of the box.

In the processing of food products or the like, usually the food product is handled in a more or less pulp or flowable form. The food is flowing through a system of conduits during the processing operation in order to be subjected to the necessary treatments for its preparation. My method of separating metallic particles from the food product may be applied at one or more selected points in the processing system. In my method of trapping the metal particles the first step is to introduce the food product into a chamber in such a manner that the flow of the food is slowed down and its direction of flow is changed toward and through a pocket and then through a second similar chamber to be reintroduced to the usual conduits which carry the food through the processing system. As the food product is passed through said pocket, it is subjected to the magnetic action. The directional forces are such as to create eddy currents and whirling action in said pocket so as to bring the entire mass of food into contact with or into close proximity of the magnetic field in the pocket while the food flows from one of said chambers into the other. The passage through the pocket between the chambers is substantially of the same area as the area of the passage in the usual conduits of the system at said point, but the area of said passage between the chambers is elongated so that it provides a wider passage of lesser height near the magnetic field, thereby reducing the distance of the flow of fluid from said magnet at all points. The metal particles in the food are attracted to the magnet, preferably at the bottom of the pocket and as the food is carried off to above the level of the pocket, these metal particles are effectively trapped. The trapped particles can be periodically cleaned out by the removal or cleaning of the magnetized surface to which the particles adhere.

Particularly in this method the flow of the food is slowed down and directed to form eddy currents generally toward a pocket, and the speed of flow is reduced, for example, to about 50% of its speed of flow in the adjacent lines or conduits of the processing system. The food is then carried through a comparatively narrow slit above said magnetic pocket and below the level of the lines and conduits leading into and out of the magnetic trap and then upwardly toward the continuation of the system of conduits. The curvature of the direction of the food or the like in the said trap and the restricted communication between the chambers through which the food is moved, assures the movement of the food close to the magnetic elements and intimately within the magnetic field in the pocket for the separation and trapping of the metallic elements from the food.

In the device for carrying out my invention I make use of a box 1 which is provided with suitable fittings 2 having an intake 3 and an outlet 4. The intake 3 and the outlet 4 are in axial alignment, but in opposite ends of the box 1 and can be interconnected between the lines or conduits 6, shown in broken lines, which conduits convey the food or the like through the processing system. It is to be noted that the intake 3 and the outlet 4 are both adjacent the top of the box 1. Below the intake 3 and the outlet 4, and offset to one side from the axis of both, is a pocket 7 of substantially rectangular cross-section. The top of the box 1 is also substantially rectangular and is formed by a pair of converging curved walls 8, the concave sides of the curved walls 8 facing towards the intake 3 and the outlet 4, respectively, and extending substantially the full width of the box 1. The curved walls 8 converge toward the transverse center line of the pocket 7 and at their joining ends are formed into a transverse baffle 9 which extends across the box 1 and extends to below the level of said intake 3 and outlet 4 and into the pocket 7. It extends to about one-half of the height of the pocket 7. The distance between the bottom of the pocket 7 and the lower edge of the baffle 9 is considerably smaller than the height or diameter of the intake 3 or the outlet 4 and of the conduits connected to said intake 3 and outlet 4. In the present illustration the height of the slot 11 under the lower edge of the baffle 9 is approximately equal to half of the diameter or height of the intake 3 or the outlet 4, respectively, but the said slot 11 extends the entire width of the box 1 which at said bottom is approximately twice as wide as the height or diameter of the said intake 3 and outlet 4 and of the conduits 6 connected to the same. In other words the comparatively narrow slot 11 under the baffle 9 is about the same area as the cross-sectional area of the intake 3 and outlet 4 and of the conduits 6 at the said connecting points, but it is restricted in height to flatten the flow at the magnetic field. The radius of curvature of the concave side of each top wall 8 gradually turns and directs the flow towards the pocket 7. The opposite faces of the baffle 9 are converging toward the slot 11 to exert further directional guidance for the flow of the fluid. The flow of the fluid entering through the intake 3 widens and is also directed downwardly and as it drops into the pocket it is also directed towards the walls of the pocket and whirls around in eddy currents at a relatively slower rate of movement than the flow of the food through the system of conduits to the intake 3.

The bottom edges of the pocket 7 are provided with suitable flanges 12. A compressible gasket such as a rubber or composition gasket 13 covers the flanges 12 all around. Upon the gasket 13 and flanges 12 is mounted a suitable magnetic device to produce a magnetic field and attract metallic particles from the food in said pocket 7. In the present illustration the magnetic unit includes a stainless steel plate 14 mounted on the top of a permanent magnet 16 by suitable fastening means such as bolts 17, so that the steel plate is demountable from the magnet 16 for cleaning or replacement. The margin of the steel plate 14 extending around the magnet 16 is covered on its outside face by suitable non-magnetic material such as a brass plate 18 or the like. This unit is removably mounted on the pocket flanges 12 and on the gasket 13. In the present illustration the flanges 12, the gasket 13, and the steel plate 14, and non-magnetic plate 18 are provided with holes 19 through which are extended wing bolts 21 for clamping the magnetic unit upon the pocket flanges 12. The compressibility of the gasket 13 seals the joint between the magnet unit and the pocket 7.

The steel plate 14 forms the bottom of the pocket 7 and as the flow of the food is directed into the pocket 7 and toward the bottom steel plate 14 and as its movement is slowed down and changed into whirling motion, and due to the passage of restricted height through the narrow slot 11, the mass of food or the like passes through the magnetic field of and comes into contact with or in close proximity to the magnetized steel plate 14 so that all metal particles, including the very finest metal particles in the food, are attracted and held on the magnetized steel plate 14. The flow on the outlet side of the baffle 9 is upward and it is directed by the concave side of the top wall 8 at the outlet 4 toward and into said outlet. It is to be noted that the corners of the pocket 7 are also curved in order to further direct the flow of the fluid around the pocket 7.

The cross-sectional general shape of the box 1 tapers substantially upwardly from the bottom pocket 7. The top of the box 1 is substantially semi-circular and substantially corresponds to the outer radius of the upper half of the intake 3 and the outlet 4, and then widens downwardly toward the bottom of the pocket 7, as shown in Fig. 2. This further adds to the downward direction and gradual downward expansion of the chamber into and through which food or the like product flows in its movement through the trap.

The construction and operation of the device is simple; the magnet unit can be quickly and easily removed, cleaned and replaced; the pocket 7 effectively holds the trapped metal particles and prevents the rising of such particles to the outlet; the change in direction and in speed of movement of the flow of the mass of food through the trap effectively cooperates for the trapping of metallic particles on the magnetic unit. In practice it was found that the herein described magnetic trap removes fine metallic particles from food products even after the food product was screened through the finest screening and magnetic action in practical use at present. In tests the food was first passed through screens and the like known in previous practice, and the masses of food so cleaned were thereafter treated by the method herein described and passed through the trap herein shown, and it was found that substantial amounts of fine metal particles are collected from such screened food products in the pocket 7 and on the magnetized steel plate 14 of the herein device. Consequently, the troublesome problem and responsibility for thoroughly clarifying food products or the like from metallic particles, is solved by my herein described device.

I claim:

1. In a magnetic trap of the character described, a closed box having an inlet at one end thereof and an outlet at the other end thereof in substantial axial alignment and adapted to be connected into a conduit system, side walls of said box diverging downwardly to below said inlet and outlet, end walls of said box widening downwardly to conform to said diverging sides and defining a bottom opening, a partition extending from the top of said box between said inlet and outlet and terminating below said inlet and outlet and being spaced above said bottom opening, a non-magnetic plate covering said bottom opening, a magnet on the plate, means to detachably secure said magnet and plate on said bottom, the spacing of said partition above said bottom being smaller than the diameter of said inlet and outlet, and the widening of said bottom being proportioned to said partition spacing to define a transversely elongated passage in the box with an area substantially equal to the respective areas of said inlet and outlet.

2. In a magnetic trap of the character described, a closed box having substantially opposite inlet and outlet adapted to be interconnected into a conduit system, a magnetic bottom on said box between said inlet and outlet, the top wall of said box curving from said inlet and outlet inwardly towards said bottom and being spaced from said bottom at about its middle at a distance smaller than the diameter of said inlet and outlet forming a passage restricted with respect to its height, the opposite sides of said box diverging from said inlet and outlet, and said top being wider at said restricted passage than at said inlet and outlet generally in proportion to the restriction of the height of said passage, the cross sectional area of said restricted passage above said bottom being substantially equal to the cross sectional area of said inlet and outlet.

ROBERT E. WILLARD.

REFERENCES CITED

The following references are of record in the file of this patent:

UNITED STATES PATENTS

| Number | Name | Date |
|---|---|---|
| 446,704 | Edwards | Feb. 17, 1891 |
| 467,645 | Richards | Jan. 26, 1892 |
| 1,335,955 | Cox | Apr. 6, 1920 |
| 1,632,699 | Denney | June 14, 1927 |
| 1,708,146 | Meyer | Apr. 9, 1929 |
| 2,162,190 | Woodford | June 13, 1939 |

FOREIGN PATENTS

| Number | Country | Date |
|---|---|---|
| 337,759 | Great Britain | May 3, 1929 |